United States Patent
Panico et al.

(10) Patent No.: US 8,036,668 B2
(45) Date of Patent: Oct. 11, 2011

(54) METHOD FOR PLANNING A CELLULAR MOBILE TELECOMMUNICATIONS NETWORK

(75) Inventors: Massimiliano Panico, Turin (IT); Indro Francalanci, Turin (IT); Claudio Guerrini, Turin (IT); Daniele Franceschini, Turin (IT)

(73) Assignee: Telecom Italia S.p.A., Milan (IT)

( * ) Notice: Subject to any disclaimer, the term of this patent is extended or adjusted under 35 U.S.C. 154(b) by 258 days.

(21) Appl. No.: 11/992,788

(22) PCT Filed: Sep. 30, 2005

(86) PCT No.: PCT/EP2005/010592
§ 371 (c)(1),
(2), (4) Date: Oct. 16, 2009

(87) PCT Pub. No.: WO2007/038956
PCT Pub. Date: Apr. 12, 2007

(65) Prior Publication Data
US 2010/0035619 A1    Feb. 11, 2010

(51) Int. Cl.
*H04W 16/00* (2009.01)
(52) U.S. Cl. ............... 455/446; 455/522; 370/342
(58) Field of Classification Search ............ 455/403, 455/446, 522; 370/318–320, 332–335, 342
See application file for complete search history.

(56) References Cited

U.S. PATENT DOCUMENTS

| | | | |
|---|---|---|---|
| 2003/0086405 A1 | 5/2003 | Silva et al. | |
| 2003/0114127 A1* | 6/2003 | Baldwin | 455/245.1 |
| 2003/0148782 A1 | 8/2003 | Gustafsson | |
| 2004/0014476 A1* | 1/2004 | Barberis et al. | 455/446 |

FOREIGN PATENT DOCUMENTS

| | | |
|---|---|---|
| EP | 1335616 | 8/2003 |
| WO | WO-2005/053344 A1 | 6/2005 |

OTHER PUBLICATIONS

3rd Generation Partnership Project; "Technical Specification Group Radio Access Network; Radio resource management strategies", (Release 6), 3GPP TR 25.922 V6.0.1, pp. 1-79, (2004).

(Continued)

*Primary Examiner* — Kent Chang
*Assistant Examiner* — Kashif Siddiqui
(74) *Attorney, Agent, or Firm* — Finnegan, Henderson, Farabow, Garrett & Dunner, L.L.P.

(57) ABSTRACT

A method for planning a cellular mobile telecommunications network includes at least one network cell and is intended to provide network services to users located in the network cell, wherein the method includes: a) setting a current provisioning rate to the highest of the provisioning rates; b) estimating a power required to the at least one network cell for providing the at least one network service in the service area at the current provisioning rate; c) comparing the estimated required power to a maximum power deliverable by the at least one cell; and, if the estimated required power exceeds the maximum deliverable power; d) reducing the service area so that the estimated power required to the at least one network cell for providing the at least one network service at the current provisioning rate in the reduced service area does not exceed the maximum deliverable power; e) updating the current provisioning rate to the immediately lower provisioning rate of said plurality, if any; and f) repeating steps b) and c) and, if required, steps d) and e).

12 Claims, 6 Drawing Sheets

OTHER PUBLICATIONS

3rd Generation Partnership Project; "Technical Specification Group Radio Access Networks; RF system scenarios", (Release 1999), 3GPP TR 25.942 V3.0.0, pp. 1-110, (2001).

R. Menolascino et al.; Project Title: "STORMS: Software Tools for the Optimisation of Resources in Mobile Systems", Project No. AC016, A016/CSE/MRM/DR/P/091/a1, pp. i-vii and 1-57, (1999).

* cited by examiner

METHOD FOR PLANNING A CELLULAR MOBILE TELECOMMUNICATIONS NETWORK

CROSS REFERENCE TO RELATED APPLICATION

This application is a national phase application based on PCT/EP2005/010592, filed Sep. 30, 2005, the content of which is incorporated herein by reference.

FIELD OF THE INVENTION

The present invention generally relates to the field of telecommunications, particularly to mobile telecommunications networks, allowing communications between mobile users. More specifically, the invention relates to cellular mobile telecommunications networks, particularly to radio telecommunications networks, and even more particularly to those networks that adopt a Code Division Multiple Access (CDMA) or Wideband CDMA (WCDMA) access scheme, such as cellular networks of the third generation like those complying with the Universal Mobile Telecommunications System (UMTS).

BACKGROUND OF THE INVENTION

Mobile telecommunications networks are usually arranged according to a cellular structure comprising a plurality of cells, each cell being defined as the set of elementary territory areas (also referred to as "pixels") served by the radio-electric signal radiated from a respective Base Radio Station (BRS), or antenna.

Among the known cellular networks, networks using the CDMA or WCDMA technique have the peculiarity that a same frequency band (or "channel") can be re-used in the various cells. Therefore, the passage of a mobile communications terminal from one cell to another, contiguous cell (an event called "handover") can be managed by using the same frequency, according to a mechanism called "soft-handover"; this mechanism provides that, in particular geographic areas, called "soft-handover areas" or "macro-diversity areas", the mobile communications terminal is able to decode signals from (and therefore to exchange information with) many antennas and, consequently, with many BRSs.

The location of the macro-diversity areas and their dimensioning are highly important factors for the correct operation and dimensioning of the network cells' apparatuses: a mobile communications terminal operating in macro-diversity uses resources of all the BRSs with which it is simultaneously connected, thus the terminal in macro-diversity uses more resources than those actually necessary for allowing the communications.

A further peculiarity of UMTS networks is that such networks are adapted to provide a plurality of different network services, such as, for example, telephony, fax, video-telephony, Internet access and Web browsing, streaming and so on. Each one of such services generally has characteristics in terms of speed (number of bits per second) and traffic (amount, symmetrical or asymmetrical) that are specific for the service under examination.

The dimensioning of the cells should therefore take into account both the characteristics of each service, and the possible associations of services over a single radio carrier, as provided for by the CDMA/WCDMA access technique.

Moreover, like every cellular radio-mobile system, also a UMTS network has common broadcast control channels in the whole cell area. Such channels contain system information, that are necessary for radio apparatuses (receivers) of the mobile communications terminals.

Due to the networks' peculiarities, the planning of UMTS networks is a complex task, requiring approaches that are substantially different from those used for previous cellular mobile telecommunications networks, particularly second-generation cellular networks like those complying with the Global System for Mobile Communication (GSM) standard, or with the Interim Standard (IS95).

In general, in view of a current network deployment, the planning aims to produce, as results or outputs, the proper positioning of the BRSs in the geographic area under examination, and also allows determining the set of radio-electric cell parameters (e.g., antenna tilt, azimuth of the direction of maximum gain, radio power, etc.) and the allocation of the radio resources assigned to the network operator (for example, radio carriers). Such outputs are determined by the planning process in compliance with planning objectives, such as, for example:

minimum value of territory covered by the network service, within an area under planning;
 maximization of the traffic to be managed among those provided within the area under planning.

Various planning techniques for UMTS networks are known; according to the followed approach, these techniques can be grouped into two different classes: statistical planning techniques and deterministic planning techniques.

Statistical planning techniques are mainly based on an approach of the Montecarlo type (refer for example to the document 3GPP TR 25.942 v3.0.0 2001-06—"RF System Scenarios—Release 1999" specification). The term "Montecarlo simulation" usually denotes a static simulation composed of a set of statistically independent snapshots. After having fixed the scenario being studied, each snapshot consists in realizing a stochastic process generated starting from different distributions of users in the area being examined. At the end of every snapshot, network performance indicators are provided as results, and the procedure ends with the statistical analysis of various performance indicators provided by every snapshot. The number of snapshots shall be enough to guarantee statistical stability for the planning results. This methodology is rather specific, and it is particularly adapted for examining performances of a UMTS network of relatively limited geographic width; owing to its intrinsic slowness, due to the statistical convergence of results, this technique is not suitable for the analysis of UMTS networks intended to cover geographical areas comparable with those of an entire nation, such as, for example, Italy.

Though keeping the characteristic of a static analysis, the deterministic planning techniques systematically take into account all pixels of the territory on which the network will be planned. Differently from statistical methods, the deterministic methods exploit, as input data, a single users distribution, and a single simulation is carried out, without the need of a statistical aggregations of the results. Deterministic planning techniques are more suitable for planning UMTS networks intended to cover relatively large geographical areas, even if the planning result is generally less adherent to the evolving reality.

Irrespective of the approach followed, one of the phases of the methods for planning a cellular mobile telecommunications network of the type herein considered, is the downlink coverage planning/evaluation, also referred to as "power control on the downlink", i.e. the planning/evaluation of the coverage in the link from the BRSs to the pixels of the area under planning. In this phase, for each cell of the area under planning, the transmission power per traffic channel that the generic cell should deliver is calculated, for each pixel belonging to the service area of that cell and for each network service (i.e., for example, for the telephony, facsimile, video-telephony, Internet access, e.g., Web browsing, services). The service area of a generic cell in respect of a generic network service is meant to include all those pixels for which that cell is the "serving cell", i.e. the cell that, among all the other possible cells of the area under planning, requires the lowest power in the uplink, i.e. in the link from hypothetical UEs located in those pixels and the BRS of that cell.

If the calculated power, for the generic pixel, exceeds the maximum power that the serving cell can deliver for a traffic channel in respect of the considered network service, that pixel is put "out-of-service" ("outage") for insufficient power in the downlink.

The set of pixels, belonging to the service area of the generic cell in respect of the generic network service, not being in outage, forms the overall service area of the cell in respect of that network service.

The union of all the overall service areas for all the network services and for all the cells of the area under planning is referred to as the global service area of the network (in the area under planning).

The downlink power control phase also encompass a cell "capacity check" on the downlink: the overall power that, according to the above-mentioned calculations, is estimated to be required to the generic cell is compared to the maximum power that the (power amplifiers of the BRS of the) cell can deliver: if the calculated overall required power exceeds the maximum power that the cell can deliver, the cell does not pass the capacity check, and it might be necessary to modify the traffic distribution and/or the locations of the cells in the area under planning.

In EP 1335616, a method for planning and/or evaluating a downlink coverage in CDMA radio networks is disclosed; the method comprises the steps of: defining a grid on one or more service areas (possibly using a grid definition derived from a planning and/or evaluation of an uplink coverage performed in advance); assigning the cells of the network to pixels defined by the grid (possibly using a cell-to-pixel assignment derived from a planning and/or evaluation of the previously performed uplink coverage); assigning a pilot power to the cells (the pilot power being a fixed proportion of the total transmission power needed for signaling purposes); estimating a desired downlink transmission power for the cells, the downlink transmission power being the sum of the pilot power and of the power for one or more downlink traffic channels; comparing the desired downlink transmission power to a maximum transmission power of the base stations. If it is found that the desired downlink transmission power is larger than the maximum transmission power, one or more changes in the radio network can be made and the planning and/or evaluation of the downlink coverage be restarted.

SUMMARY OF THE INVENTION

The Applicant has observed that the methods known in the art for planning a UMTS network, particularly concerning the downlink power control phase, suffer from limitations that impact the efficiency of the whole planning method, and the networks built following such methods are as a consequence not optimized.

In particular, the Applicant has observed that in CDMA/WCDMA networks like those complying with the UMTS standard, network services can be classified, in terms of provisioning rate, e.g. bit-rate, into two broad categories: (i) Non-Guaranteed bit-rate Services (NGS) and (ii) Guaranteed bit-rate Services (GS). NGSs include for example packet-switched network services, or circuit-switched network services, that allow being assigned a bandwidth that varies in time (for example, Web browsing services, messaging services, file transfer services, and the like); GSs include for example packet-switched services or circuit-switched services that are characterized by a high sensitivity to delays in the radio link (for example, video-call services, vocal calls, and the like). While GSs have a fixed bit-rate, NGSs allow the bit-rate to be down-scaled: for example, in case of network congestion, the generic cell can reduce the bit-rate of the NGSs, so as to guarantee the target bit-rate to the GSs.

The Applicant has observed that prior-art network planning methods, particularly as far as the downlink power control phase is concerned, like for example the downlink coverage planning and/or evaluation method described in the cited document, do not take this property into account: in those known methods, all the network services are considered de-facto as GSs, i.e. as services whose bit-rate is fixed and cannot be scaled down; in the planning process, and particularly in the downlink power control phase, all the network services are thus indiscriminately treated as GSs, with bit-rate equal to the specific maximum bit-rate for each network service.

The Applicant has observed that this is not true-to-reality, and contrasts with the network behavior in the real environment; the Applicant has found that a generic cell's service area in respect of a generic NGS can actually be regarded as the union of different sub-areas in each of which a respective bit-rate is guaranteed, including a sub-area wherein the maximum bit-rate is guaranteed and one or more other sub-areas wherein reduced bit-rates are guaranteed.

Adopting the known methods, the results of the planning process, for example in terms of global service areas for the cells, may be strongly affected: for example, the global service area calculated for a generic network service will be the set of pixels in which the cell can guarantee that service at the maximum bit-rate, even if, in the practice, the service considered is susceptible of being offered at a reduced bit-rate, in a wider area. For example, for a Web-browsing service, the global Web-browsing service area calculated for the generic cell may include only the pixels wherein the maximum bit-rate of 384 Kbit/s is guaranteed, all the remaining pixels being considered in outage, whereas in the practice that service may be offered in a wider area, even if at reduced bit rates, e.g. 128 Kbit/s or 64 Kbit/s.

In other words, the Applicant has observed that the known planning methods, like the one disclosed in the cited document, are too conservative, at least as far as the downlink power control phase is considered; this is especially true in presence of services being characterized by a high unbalance between the uplink and downlink: in these cases, the downlink results penalized. The assumption that the bit-rate is constant and equal to the maximum bit-rate even for NGSs produces an overdimensioning of the network apparatuses (downlink power amplifiers of the BRSs), which unnecessarily increases the network deployment costs.

In view of the outlined state of the art and related problems, drawbacks and limitations, the Applicant has tackled the general problem of improving the known planning methods of cellular mobile telecommunications networks.

In particular, the Applicant has tackled the problem of how to properly carry on the downlink power control phase of the planning process.

The Applicant has found that, in planning a cellular mobile telecommunications network suitable to deliver at least one network service at a plurality of different provisioning rate, the above problem can be solved by determining, for each of the provisioning rate, a corresponding service area wherein the considered service can be delivered at that provisioning rate. In more detail, the method of the invention includes estimating, for each cell and starting from the highest provisioning rate, the power required to the cell for providing the considered service in a predetermined service area (possibly discarding the elementary area elements having a required transmission power above a predetermined threshold), and then comparing the estimated power to a maximum power deliverable by the cell; if the maximum deliverable power is not exceeded, that service area (possibly restricted by discarding elementary area elements) is assigned to the considered provisioning rate; differently, if the maximum deliverable power is exceeded, the service area is reduced so as to have an estimated power not exceeding the maximum deliverable power; this reduced service area is assigned to the considered provisioning rate and the above steps are repeated for the immediately lower provisioning rate, if any.

According to a first aspect thereof, the present invention thus relates to a method for planning a cellular mobile telecommunications network including at least one network cell and intended to provide network services to users located in said network cell, wherein the network services include at least one network service deliverable at a plurality of provisioning rates, the method including evaluating a downlink coverage of the network in a predetermined service area, wherein the step of evaluating includes:

a) setting a current provisioning rate to the highest of the provisioning rates;

b) estimating a power required to the at least one network cell for providing the at least one network service in the service area at the current provisioning rate;

c) comparing the estimated required power to a maximum power deliverable by the at least one cell; and if the estimated required power exceeds the maximum deliverable power:

d) reducing the service area so that the estimated power required to the at least one network cell for providing the at least one network service at the current provisioning rate in the reduced service area does not exceed the maximum deliverable power;

e) updating the current provisioning rate to the immediately lower provisioning rate of said plurality; and f) repeating steps b) and c) and, if required, steps d) and e).

The predetermined service area preferably corresponds to a service area determined at the end of an uplink coverage evaluation of the planning method.

Moreover, the service area is preferably made up of a plurality of elementary area elements, and the step of estimating a power required to the at least one network cell preferably comprises:

estimating, for each of the elementary area elements, a respective required transmission power; and discarding from the service area the elementary area elements having a respective required transmission power above a predetermined transmission power threshold.

The step of reducing the service area preferably comprises:

g) ordering the elementary area elements in a list based on the value of at least one parameter selected from the group consisting of:

link loss;
total traffic offered by the pixels;
type of traffic offered by the pixels;

h) obtaining the reduced service area by including elementary area elements taken from the ordered list starting from one end thereof;

i) calculating a total required power corresponding to the elementary area elements included in the reduced service area;

l) repeating steps h) and i) until the total required power exceeds the maximum deliverable power.

Preferably, the method further includes varying the maximum deliverable power as a consequence of said updating the current provisioning rate.

The step of varying the maximum deliverable power preferably includes:

defining a first and at least one second maximum deliverable power thresholds, the first threshold being lower than the second threshold;

initializing the maximum deliverable power to a value corresponding to the first power threshold; and as a consequence of the step of updating the current provisioning rate, setting the maximum deliverable power to the second power threshold.

Preferably, the method further comprises determining a global service area for the at least one cell as a union of the supported service areas.

Moreover, the method preferably comprises the further step of setting an initial required power of the at least one cell to a power corresponding to common communications channels of the cell.

The step of estimating the power required to the at least one network cell for providing the at least one network service in the service area may include adding to the power corresponding to common communications channels of the cell a power required for providing the at least one network service in the service area.

The at least one network service may also include at least one guaranteed network service having a single admissible provisioning rate, the step of estimating the power required to the at least one network cell for providing the at least one network service includes adding to the power corresponding to common communications channels of the cell a power required for providing the at least one guaranteed network service in the service area, and a power required for providing the at least one network service at the selected provisioning rate.

According to a further aspect thereof, the present invention relates to a data processing system comprising means adapted to carry out the steps of the method previously described.

Moreover, the present invention relates to a computer program comprising instructions for carrying out all the steps of the method previously described when said computer program is executed on a computer system.

The present invention further relates to a cellular mobile telecommunications network including at least one network cell and intended to provide network services to users located in said network cell, wherein the network services include at least one network service deliverable at a plurality of admissible provisioning rates, said cellular mobile telecommunication network being planned by applying the method previously described.

BRIEF DESCRIPTION OF THE DRAWINGS

The features and advantages of the present invention will be made apparent by the following detailed description of an embodiment thereof, provided merely by way of non-limitative example, description that will be conducted making reference to the annexed drawings, wherein.

DETAILED DESCRIPTION OF THE PREFERRED EMBODIMENT(S) OF THE INVENTION

Figure 1:
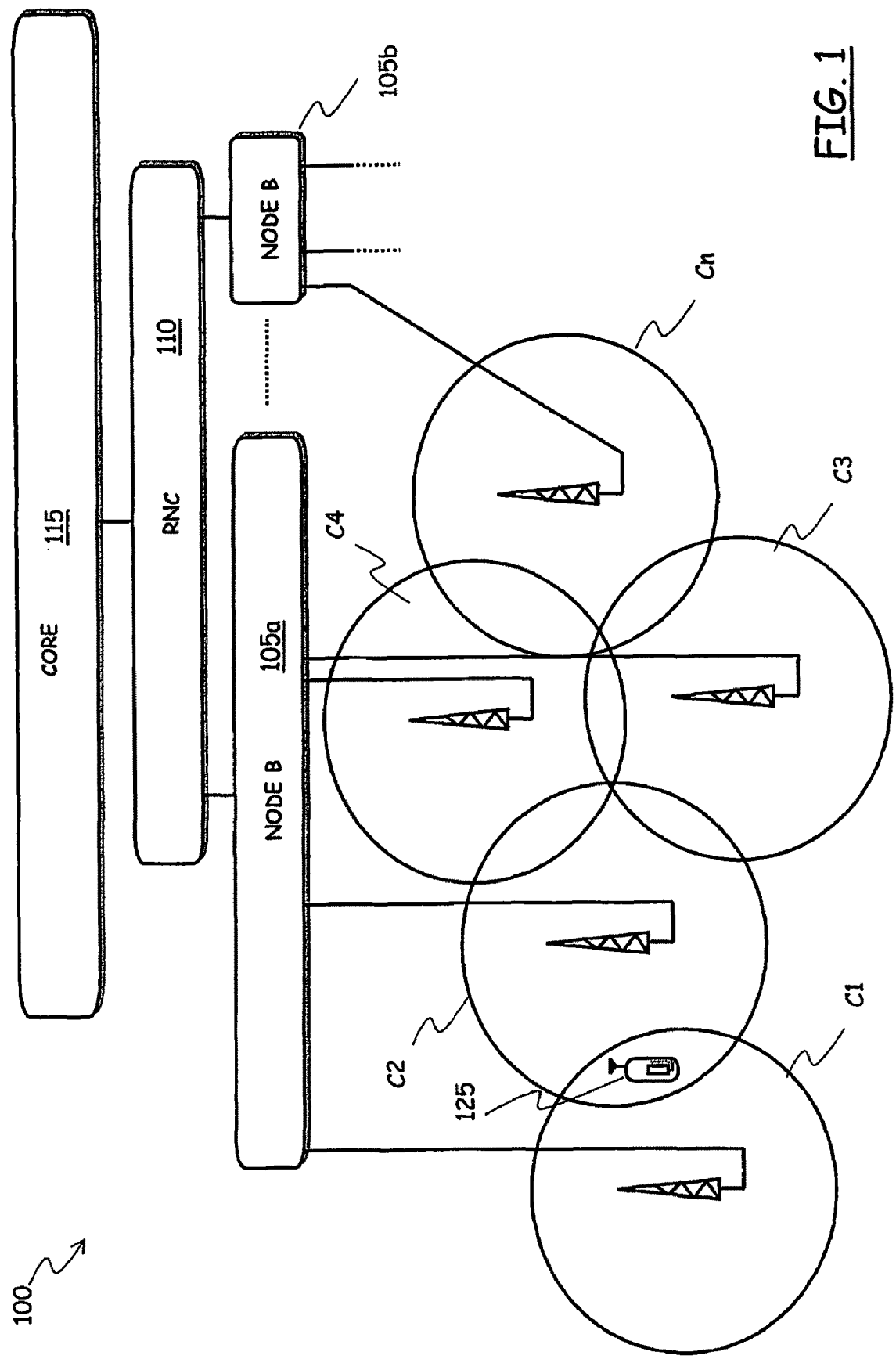
FIG. 1 pictorially shows a portion of a UMTS network being planned, intended to cover a respective geographic area, with a plurality of network cells.

Referring to the drawings, in FIG. 1 there is schematically depicted a portion of a CDMA network, particularly a UMTS network under planning, the network portion being intended to provide cellular mobile communications capability within a given geographic area.

The UMTS network portion under consideration, identified globally by reference numeral 100, comprises a plurality of cells C1, C2, C3, C4, . . . , Cn (schematically depicted as circles), each one having a respective area coverage (the area of the circles). The cells C1, C2, C3, C4, . . . , Cn are each one made up of a plurality of pixels, i.e., they are the set of geographic points covered and served by the radio electromagnetic signal irradiated by a respective cell's BRS, schematized in the drawing as an antenna.

Usually, groups of three to six cells (on average) are managed by a network entity called "Node B", such as the Node Bs 105a and 105b in the drawing (where, merely by way of example, it is assumed that the cells C1, C2, C3, and C4, are managed by the Node B 105a, and that the cell Cn is managed by the Node B 105b).

Groups of Node Bs are managed by a Radio Network Controller (RNC), like the RNC 110 shown in the drawing; the RNCs are connected to the core UMTS network 115.

A generic UE, like the UE 125 depicted as located within the cell C1, can receive signals transmitted by the transmitters, and irradiated by the antennas, of different cells, e.g. the cells C1 and C2, and is able to differentiate among them.

This differentiation of signals coming from different transmitters is made possible by the adoption, in the UMTS standard, of the CDMA/WCDMA access technique. Without entering into excessive details, known to those skilled in the art and not relevant to the understanding of the present invention embodiment, each transmitter (particularly, the transmitter of the generic network cell) implements a spreading and a subsequent scrambling of the signal to be transmitted. The signal (data) to be transmitted, having a given symbol rate (usually called the bit rate) is first submitted to a spreading process, using a spreading code, in order to "widen" its spectrum and distribute (and thus lower) its power over the whole channel bandwidth. The spreading code has a higher number of symbols than the signal to be transmitted, thus the spread signal has a symbol rate (a "chip rate", in jargon) higher than the bit rate of the initial signal. The spread signal is then submitted to a scrambling process, using a scrambling code or scrambling sequence. The signal scrambling process does not change the chip rate, thus the signal to be transmitted "over-the-air" has a chip rate equal to that of the spread signal. The scrambling process is used for making signals transmitted by the transmitters of different cells distinguishable (provided that the scrambling codes are properly assigned to the cells).

The geographic area represented schematically in FIG. 1 is assumed to be an area of the UMTS network to be planned.

Figure 2:
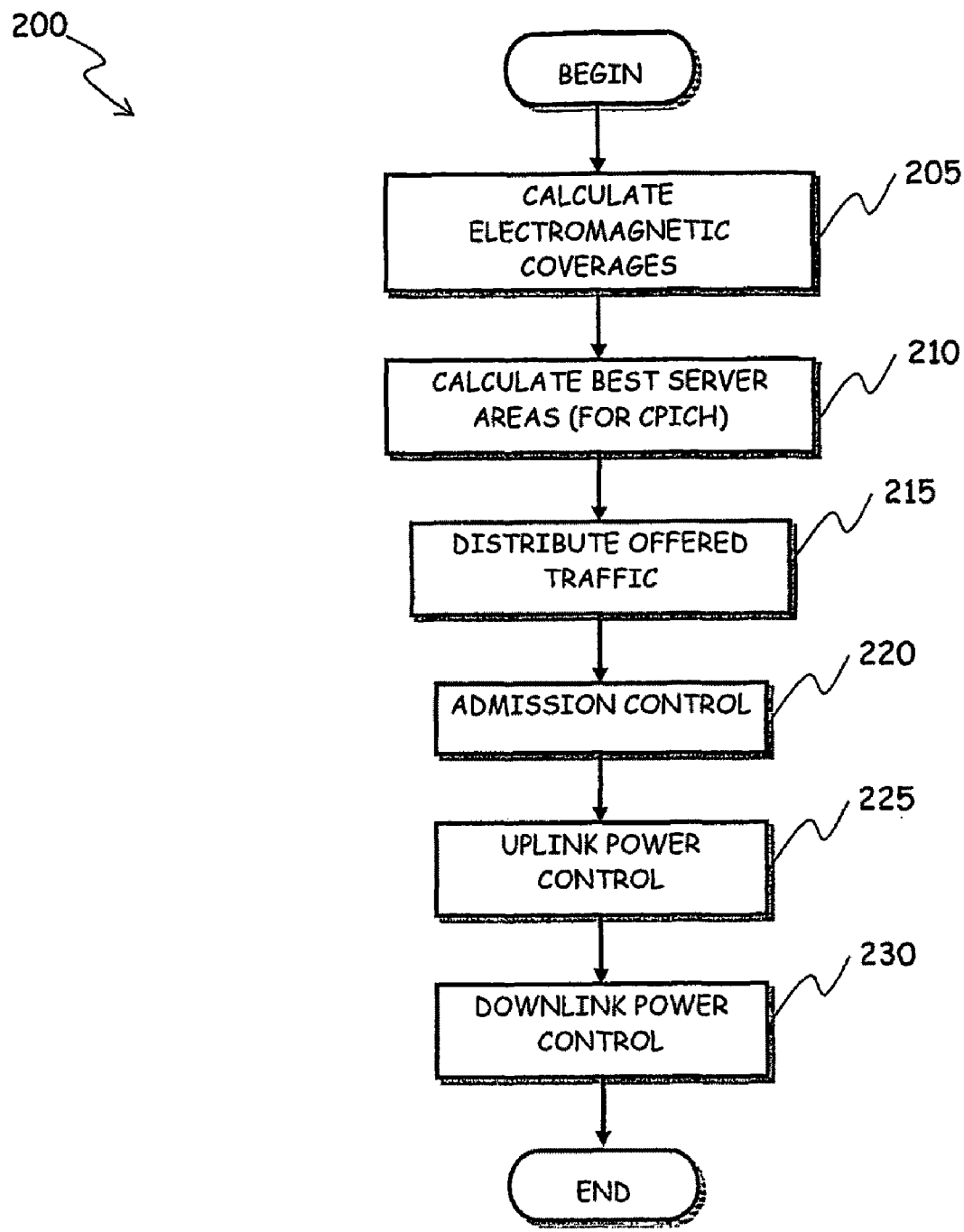
FIG. 2 is a schematic, simplified flowchart of the main steps of a network planning process.

The schematic flowchart of FIG. 2 shows the main phases or steps of a network planning process 200. It is pointed out that the various steps of the planning process, which will be hereinafter analyzed in detail, might be performed in a different chronological order compared to the one shown.

The area under planning is ideally subdivided into elementary areas or pixels, for example square areas of 50 m by 50 m.

Firstly, the electromagnetic coverages of the various network cells are calculated (block 205), for a given, starting network configuration (number and position of BRSs/cells, radio equipment of each BRS, and the like). Calculating the electromagnetic coverages means in particular determining the sizes and the characteristics of each "coverage", i.e., the locus of pixels in which the radio-electric signal is received within a certain radius (for example, 80 Km) from the radiating antenna of the generic cell.

Then, the so-called "best server areas" of the various cells is calculated (block 210). As a result of this step, every pixel belonging to the area under planning is univocally assigned to a respective network cell, i.e. to a respective BRS, which is referred to as the "best server cell" of that pixel. In particular, the best server cell of a generic pixel is the cell whose BRS radiates in that pixel a signal having a power level (the RSCP), as far as the Common PIlot CHannel (CPICH) is considered, being the highest compared to the power level of the signals radiated in the same pixel by all the other cells that belong to the area under planning.

The distribution of the traffic offered in the network, for the different network services, across the area under planning is then calculated (block 215); as a result, an estimation is obtained of the traffic offered by each network service (e.g. telephony, fax, video-telephony, Internet access, streaming and so on) to each pixel.

A phase referred to as "admission control" follows (block 220). In this phase, based on the previously calculated electromagnetic coverages (block 205), and exploiting the results of the offered traffic distribution (block 215), sub-areas within the best server areas of the various cells are determined: the computations involved by the subsequent steps of the planning process phases can be restricted to these sub-areas, instead of being performed over the whole best server areas. In particular, and merely by way of example, the admission control phase may be carried out as set forth in paragraph 3 of the document AC016/CSE/MRM/DR/P/091 entitled "STORMS Project Final Report", developed under the STORMS (Software Tools for the Optimization of Resources in Mobile Systems) project, promoted by the European Union. Essentially, a cell's loading factor $\eta$ is determined, with value ranging from 0 to 1, calculated as the ratio of a target cell load, i.e. the load that it is expected that that cell will accept, to a cell's maximum load (also designated as "pole capacity"), wherein the maximum load is the load that cannot be exceeded not to put the system under unstable conditions. The sub-area (i.e., the subset of pixels of the previously calculated best server area) thus determined ("admission control area") forms the computation domain of the following steps of the planning process. The admission control area reduces as the target cell load value decreases to 0; if the value of the loading factor $\eta$ is equal to the maximum possible value ($\eta=1$), the admission control area degenerates into the best server area.

In a subsequent phase, referred to as "uplink power control" (block 225), the network coverage in uplink is evaluated, for the given network configuration. In particular, the power required, for each traffic channel, to the UEs located in the admission control areas is calculated. For every pixel of the admission control areas. and for each network service, the cell is determined which requires the lowest transmission power by a hypothetic UE located in that pixel: the cell thus determined forms the serving cell of that pixel, as far as that network service is considered. If the lowest transmission power requested to the UEs calculated in this phase exceeds the maximum power deliverable by the generic UE (a parameter which is predetermined and forms one of the inputs to the planning process), the pixel under consideration is put in outage for insufficient power in uplink. The set of pixels for which the generic cell is the serving cell in respect of the generic network service forms the "cell uplink service area" of that cell for that service in uplink. The set of cell service areas in uplink for the various cells of the area under planning and for the various network services forms the "uplink service area". The set of pixels put in outage for insufficient power in uplink, for the generic network service, forms the "service outage area" in uplink.

In other words, in the uplink power control phase, a plurality of sets of maps is determined, one set of maps for each network service; the generic set of maps includes in turn a number of maps equal to the number of cells of the area under planning: each map is formed by those pixels for which the considered cell (the serving cell) requires the lowest power in the uplink. Starting from said plurality of sets of maps, a new plurality of sets of maps is determined, by eliminating those pixels for which the transmission power in uplink exceeds the predetermined maximum transmission power of the generic UE, for the generic network service.

In the following phase of the planning process, referred to as the "downlink power control" (block 230), an evaluation of the downlink coverage by the network portion under planning is performed, so as to find out whether, for the given network configuration based on which the uplink coverage has been evaluated, the downlink is a limiting factor.

Let it first be assumed that no distinction is made among the various network services, and that, like in the prior art, the generic service is treated as a GS, even if it actually is an NGS, with guaranteed bit-rate equal to service's maximum bit-rate.

For each cell belonging to the area under planning, the cell uplink service area, calculated in the uplink power control step, is considered. For each pixel belonging to the cell uplink service area, and for every network service, the power per traffic channel required to the considered cell is calculated (thus, the power necessary for supporting the connection with the generic UE located on that pixel and exploiting the considered network service is calculated), assuming that the maximum bit-rate of the service is to be guaranteed. In order for a generic pixel to be considered "served" by the network, the power per traffic channel required to the cell should not exceed the maximum power deliverable by the cell per traffic channel; if, for the generic pixel, the calculated power exceeds the maximum power deliverable per traffic channel by that cell for the considered network service, that pixel is put in outage (i.e. it is discarded) for insufficient power in downlink. The set of pixels, belonging to the generic cell uplink service area for the generic service and not being in outage for insufficient power in downlink, forms the "cell global service area" of the cell for that service. The union of the cell global service areas of the various cells of the area under planning, for the various network services, forms the "network global service area". The set of pixels in outage for insufficient power in downlink, for the generic network service, forms the "downlink outage area" of that service.

The downlink power control phase also encompasses a check of the cell capacity for the total power delivered in downlink. The overall power required to the generic cell (the total power that has to be delivered by the cell for all the traffic channels, for all the network services, plus the power delivered by the cell for the common channels—CPICH, SCH and the like) is then compared to a maximum power deliverable by that cell.

If the overall required power does not exceed the maximum deliverable power, the generic cell passes the capacity check. The cell global service area, for the generic network service, will thus include all those pixels for which:

a) the required power per traffic channel in uplink does not exceed the maximum power deliverable by the generic UE, for the considered network service; and b) the required power per traffic channel in downlink does not exceed the maximum power deliverable by that cell per traffic channel, for the considered network service.

If instead the overall required power exceeds the cell's maximum deliverable power, the capacity check is not passed: the cell is in capacity congestion. The cell global service area will thus include a sub-set of the pixels satisfying the conditions a) and b) above, such sub-set being formed by the pixels that satisfy the further condition:

c) the total power delivered to all the UEs located on the pixels of the cell global service area, for all the network services, is equal to the maximum power deliverable by that cell.

Such a subset of pixels may for example be determined by sorting all the pixels satisfying the conditions a) and b) above by increasing attenuation, and selecting, among the sorted list of pixels thus obtained, starting from the pixel having the lowest attenuation, the first k pixels for which the condition c) is satisfied.

Also, if cells in capacity congestion are found, it might be necessary to reconsider the assumptions made for the inputs to the planning process, for example the distribution of the offered traffic, and the location of the cells in the area under planning.

The above procedure, treating all the network services in the same way, produces results that are not true-to-reality, as discussed in the foregoing.

As already mentioned, the services offered by a generic UMTS network can generally be classified, in terms of provisioning rate, e.g. bit-rate, into Non-Guaranteed bit-rate Services (NGS) and Guaranteed bit-rate Services (GS); NGSs include for example packet-switched network services, or circuit-switched network services that allow an assigned bandwidth to be varied in time (for example, Web browsing services, messaging services, file transfer services, and the like), whereas GSs include for example packet-switched services or circuit-switched services that are characterized by a high sensitivity to delays in the radio link (for example, video-call services, vocal calls, and the like).

While the bit-rates of the GSs are fixed and must be guaranteed, NGSs allow a down-scalability of their bit-rates; thus, for example, in case of network congestion, the generic cell can reduce the bit-rate of the NGSs, so as to guarantee the target bit-rate to the GSs.

The down-scalability of the bit-rate of the NGSs is used in the normal network operation by the cells' apparatuses to implement so-called "soft-congestion control" policies, based on Radio Resource Management (RRM) algorithms such as those outlined in the document TR 25922 6.0.1 (2004-04) entitled "$3^{rd}$ Generation Partnership Project, Technical Specification Group Radio Access Network, Radio resource management strategies (Release 6)". In particular, and just by way of example, two or more power fraction thresholds may be set, expressed as percentages of the maximum power deliverable by the generic cell; as long as the instantaneous power requested to the cell remains below the lowest threshold, the NGSs are offered at their maximum bit-rate; if the lowest threshold is exceeded, the bit-rate of one or more NGSs is reduced; if the instantaneous power requested to the cell exceeds the next power fraction threshold, the bit-rate of one or more NGSs is reduced further, and so on.

The downlink power control method according to the invention embodiment described in the following does not treat every network service as a GS, rather it takes into account the fact that a generic network service may be either a GS or an NGS, and, in the latter case, account is taken of the fact that the bit-rate of such a service is down-scalable.

Figure 3:
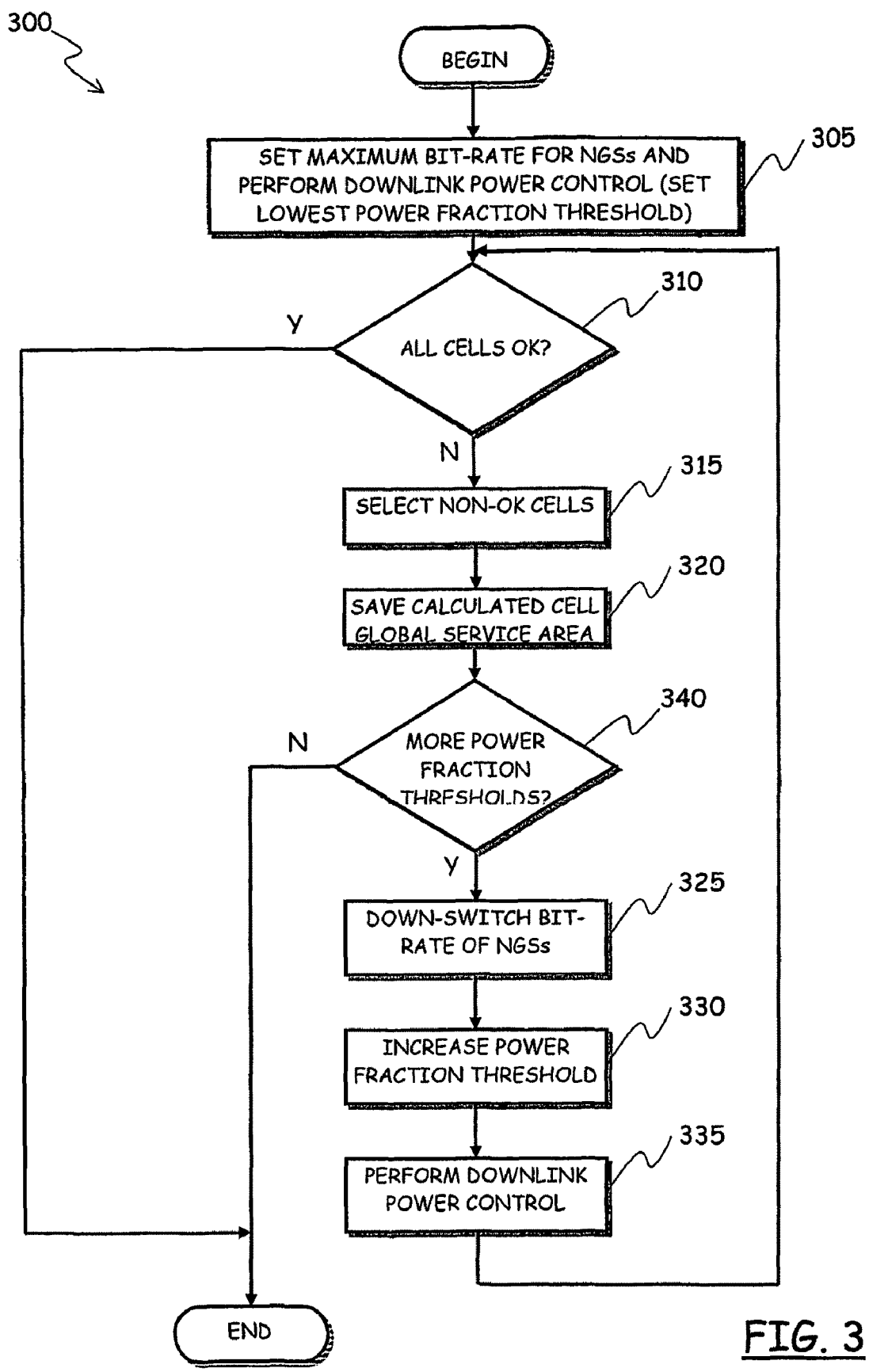
FIG. 3 is a schematic, simplified flowchart of an uplink power control method of the network planning process, in an embodiment of the present invention.

In the following, a downlink power control method 300 according to an embodiment of the present invention will be described, making reference to the flowchart of FIG. 3.

Firstly, after having identified GSs and NGSs, the maximum bit-rates are selected for the NGSs (the bit-rates for the GSs are fixed), and having set two or more power fraction thresholds for those cells which are intended to support NGSs (for example, a lower threshold, e.g. equal to 50% of the maximum power deliverable by the cell, an intermediate threshold, e.g. equal to 60% of the maximum deliverable power, and an upper threshold, e.g. equal to 100% of the maximum deliverable power), the downlink power control is performed in the way outlined in the foregoing.

Figure 4A:
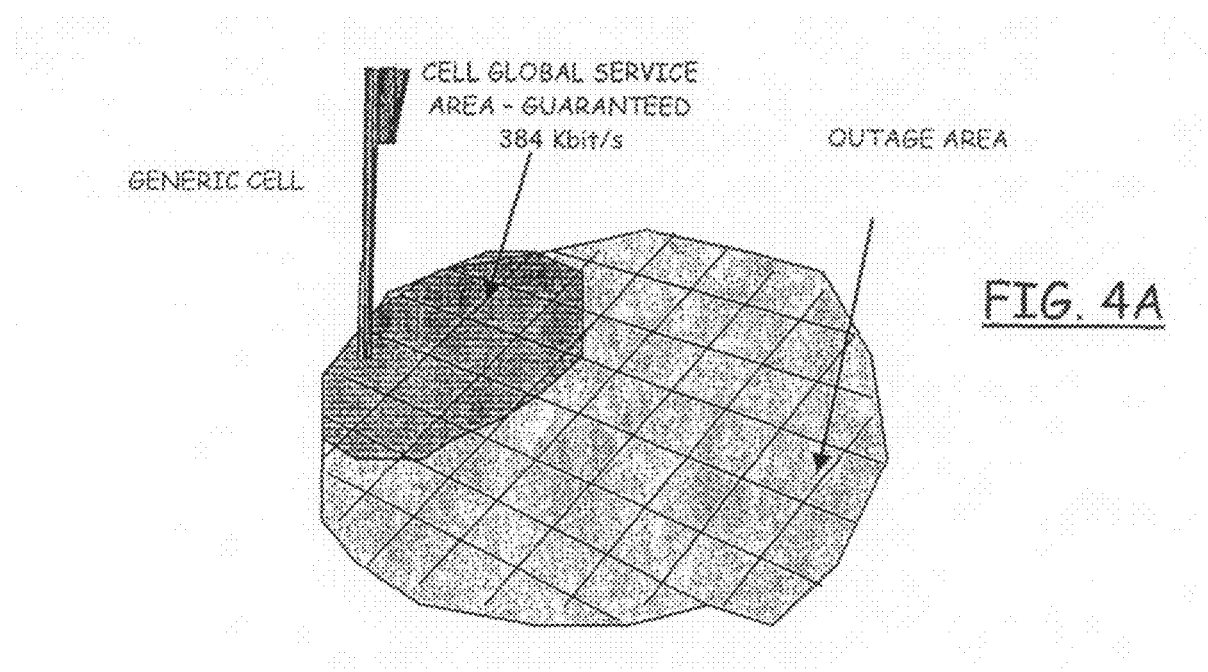
FIGS. 4A and 4B schematically depicts a generic network cell, with associated network service areas for a generic, non-guaranteed bit-rate network service.

If all the cells of the area under planning pass the capacity check (decision block 310, exit branch Y), then the cell global service area determined for the generic NGS is that in which the NGS is guaranteed at the maximum bit-rate (e.g., 384 Kbit/s, for an NGS admitting a down-scaling to 128 Kbit/s or even 64 Kbit/s, refer for example to FIG. 4A). In particular, in order to perform the capacity check, instead of using the cells' maximum deliverable power, as described in the foregoing, the first, lower threshold is used (50% of the maximum deliverable power).

If instead at least one cell does not pass the capacity check (decision block 310, exit branch N), the cell(s) that did not pass the capacity check is(are) selected (block 315), and the cell global service area(s) calculated for that(those) cell(s) is(are) saved (block 320): the saved cell global service area(s) is(are) the set(s) of pixels satisfying the conditions a), b) and c) set forth above, wherein, as far as the NGSs are considered, the maximum bit-rate (e.g., 384 Kbit/s) can be guaranteed.

Then, in respect of the selected cell(s), the bit-rate of one or more of the NGSs intended to be offered is down-switched (block 325), for example from 384 Kbit/s to 128 Kbit/s; the power fraction threshold is correspondingly increased (block 330), for example from 50% to 60% of the maximum deliverable power, and the downlink power control is repeated (block 335), unless there are no further power fraction thresholds (i.e., unless the bit-rates of the NGSs have already being down-scaled to the lowest value) (decision block 340, exit branch N). It is observed that, each time the downlink power control is performed, the calculated cell global service area of the cells that do not pass the capacity check is saved.

Figure 4B:
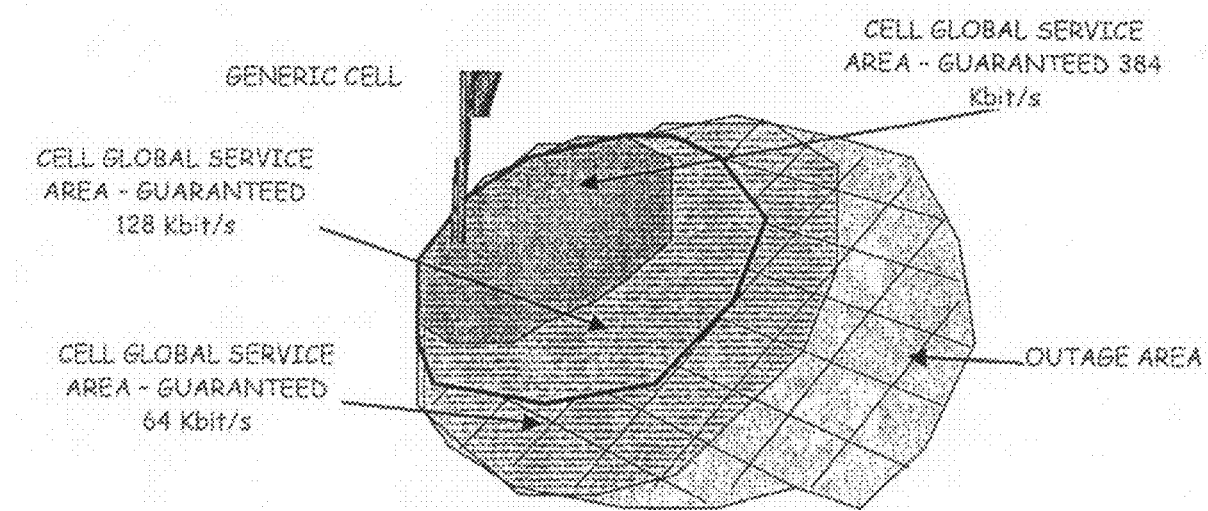

At the end, the downlink power control method 300 gives, for each cell, a respective overall cell global service area which, for those cells intended to provide NGSs, may be formed by two or more sub-areas, each sub-area being a portion of the overall cell global service area wherein the NGSs can be guaranteed at a respective bit-rate selected among the possible bit-rates (such as in the example of FIG. 4B, wherein the overall cell global service area is made up by a first sub-area wherein an NGS is guaranteed at 384 Kbit/s, a second sub-area in which the NGS is guaranteed at 128 Kbit/s, and a third sub-area in which the NGS is guaranteed at 64 Kbit/s); typically, the sub-area in which an NGS is guaranteed at the lowest possible bit-rate is the widest among and includes the sub-areas in which the NGS is guaranteed at higher bit-rates; the overall cell global service area is thus the widest sub-area, in which the NGS is guaranteed at the lowest possible bit-rate.

Hereinafter, an algorithm implementing the downlink power control method outlined in the flowchart of FIG. 3 will be described in greater detail, according to an embodiment of the present invention.

Firstly, a list of parameters is provided hereinbelow, with corresponding definitions, that will be referred to in the description of the downlink power control procedure according to the invention embodiment herein described:

| Symbol | Definition |
| --- | --- |
| $N_{cells}$ | Number of cells included in the area under planning. |
| $S_j^{GS}$ | Set of GSs supported by the generic cell $C_j$. |
| $S_j^{NGS}$ | Set of NGSs supported by the generic cell $C_j$. |
| $Nds_s$ | Maximum number of bit-rate values in down-switch supported by the generic NGS s in downlink. |
| (m, n) | Coordinates of the generic pixel in the area under planning. |
| $N_{(m,n)}^s$ | Number of UEs present on the generic pixel (m, n) and using the generic service s. |
| $\Theta_j^s$ | Set of pixels belonging to the initial computation domain for the power control algorithm in downlink, for the generic service s and the generic cell $C_j$ (e.g., the entire service area for the service s and the cell $C_j$ in uplink). |
| $\Omega_j^s(r)$ | Set of pixels belonging to the cell service area in downlink of the cell $C_j$, for the generic NGS s and in respect of the $r^{th}$ level of bit-rate value down-switch. |
| $Z_j^s$ | Set of pixels belonging to the cell service area in uplink of the cell $C_j$, for the generic GS s. |
| $r_j^s$ | Level of bit-rate value down-switch for the generic NGS s in respect of the generic cell $C_j$ (values ranging from 1 to $Nds_s$). |
| $SNR_s^{GS}$ | Target signal-to-noise ratio for the generic GS s in downlink. |
| $SNR_s^{NGS}(r)$ | Target signal-to-noise ratio for the generic NGS s in downlink, in respect of the down-switch level (i.e., the maximum bit-rate) r (r ranging from 1 to $Nds_s$). |

-continued

| Symbol | Definition |
|---|---|
| $N_{THR}^{CONG}$ | Number of power fraction thresholds (thresholds set as fractions of the maximum power deliverable by the generic cell, e.g. three power fraction thresholds, corresponding to 50%, 60% and 100% of the maximum deliverable power) |
| $p_j$ | Congestion level for the generic cell $C_j$ (values ranging from 1 to $N_{THR}^{CONG}$). |
| $Thr_{CONG}(p)$ | Maximum deliverable power threshold for the generic cell at the congestion level p (p in the range [1; $N_{THR}^{CONG}$]; the thresholds are sorted in increasing order. |
| $P_{(m;n),s}^{j}$ | Power required to the generic cell $C_j$ for guaranteeing the target SNR to the UEs present on the pixel (m, n) belonging to $\Omega_j^s$ (r), using the generic network service s. |
| $P_{DCH}^{Max}(s)$ | Maximum power deliverable on the dedicated traffic channel DCH to the service s by the generic cell. |
| $P_{DCH}^{Min}(s)$ | Minimum power deliverable on the dedicated traffic channel DCH to the service s by the generic cell. |
| $P_{Noise}$ | Thermal noise power. |
| $P_{req}(j)$ | Total power to be transmitted by the generic cell (BRS) $C_j$. |
| $P_{MAX}(j)$ | Maximum power deliverable by the generic cell (BRS) $C_j$. |
| $P_j^{SCH}$ | Average power transmitted on the SCH by the generic cell (BRS) $C_j$. |
| $P_j^{ComCH}$ | Average power transmitted on the common channels (excluded the SCH) by the generic cell (BRS) $C_j$. |
| $P_j^{CCH}$ | Average power transmitted on all the common channels by the generic cell (BRS) $C_j$ ($P_j^{CCH} = P_j^{SCH} + P_j^{ComCH}$) |
| $\alpha_j$ | Coefficient of orthogonality among the spreading codes in downlink used by the generic cell $C_j$. |
| $Loss_{(m,n),j}$ | Link attenuation from the generic pixel (m, n) to the generic cell $C_j$. |
| $\bar{\chi}_s$ | Service Activity Factor (SAF) of the generic service s in downlink, a statistical parameter indicating the ratio of the average transmission time in downlink to the total connection time in respect of the service s |
| $T_{(m,n),s}$ | Number of UEs present on the generic pixel (m, n) in respect of the generic network service s. |
| $Flag\_KO_j$ | Congestion flag, a parameter used to denote a congestion situation and equal to 1 if the generic cell $C_j$ delivers a power exceeding the maximum admissible deliverable power (congestion), 0 otherwise (no congestion). |

The algorithm provides for an initialization phase in which several of the above-listed parameters are initialized to prescribed initialization values.

Firstly, for all the cells of the area under planning, the respective congestion level is initialized to 1:

$$p_j = 1 \text{ for } j = 1 \text{ to } N_{cells}.$$

Then, for each cell and for each NGS, the bit-rate down-switch level of that service is initialized to 1:

$$r_j^s = 1 \text{ for } j = 1 \text{ to } N_{cells}, \forall s \in S_j^{NGS}.$$

Afterwards, the pixel sets $\Omega_j^s(r)$ and $Z_j^s$ are initialized, for every cell $C_j$, every NGS and GS, and every bit-rate down-switch level:

$$\Omega_j^s(r) = \forall (m, n) \in \Theta_j^s$$
$$Z_j^s = \forall (m, n) \in \Theta_j^s, \text{ for } j = 1 \text{ to } N_{cells},$$
$$\forall s \in S_j^{NGS} \text{ and } S_j^{GS}, \text{ and for } r = 1 \text{ to } Nds_s.$$

In other words, the sets $\Omega_j^s(r)$ and $Z_j^s$ are initialized so as to include all the pixels included in the set $\Theta_j^s$ (the initial calculation domain), including in turn, for example, all the pixels that belong to the cell service area in uplink for the cell Cj and in respect of the service s). However, nothing prevents that, in alternative embodiments of the invention, a different initial calculation domain is chosen.

Furthermore, for each cell $C_j$ of the area under planning, the value $P_{req}(j)$ of the total power transmitted by the cell is initialized to the value $P_j^{CCH}$, i.e. to the sum of the average power transmitted on the common channels:

$$P_{req}(j) = P_j^{ComCH} + P_j^{SCH} = P_j^{CCH}.$$

However, nothing prevents that, in alternative embodiments of the invention, a different initial total power transmitted by the cell is chosen.

For each cell of the area under planning, the respective congestion flag $Flag\_KO_j$ is initialized to 0 (no congestion):

$$Flag\_KO_j = 0 \text{ for } j = 1 \text{ to } N_{cells}.$$

Finally, for each cell $C_j$ of the area under planning and each network service s, the target SNR is initialized:

$$SNR_s = \begin{cases} SNR_s^{GS} & \text{if } s \in S_j^{GS} \\ SNR_s^{NGS}(r_j^s) = SNR_s^{NGS}(1) & \text{if } s \in S_j^{NGS}. \end{cases}$$

Once the initialization phase is terminated, for each pixel (m,n) belonging to the set $\Theta_j^s$, and for each network service s, the transmission power required to the generic cell (BRS) $C_j$ is calculated; the calculated power is the transmission power necessary for the transmission over a Dedicated traffic CHannel (DCH) in such a way as to guarantee the target SNR for that service. In particular, it can be shown that the target SNR is given by:

$$SNR_s = \frac{\frac{p^j_{(m,n),s}}{Loss_{(m,n),j}}}{\frac{(P_{req}(j) - p^j_{(m,n),s}) \cdot (1 - \alpha_j) + \alpha_j \cdot P^{SCH}_j}{Loss_{(m,n),j}} + P_{Noise} + \sum_{\substack{k=1 \\ k \neq j}}^{N_{cells}} \frac{P_{req}(k)}{Loss_{(m,n),k}}}$$

where the denominator gives the total interference at the generic pixel (m,n), sum of an intra-cell interference contribute (depending on the coefficient of orthogonality among the spreading codes), a thermal noise interference contribute and an inter-cell interference contribute.

From the above equation, the power $p_{(m,n),s}^j$ required to the generic cell $C_j$ for guaranteeing the target SNR to the UEs present on the pixel (m,n) and wishing to enjoy the generic network service s can be derived:

$$p_{(m,n),s}^j = SNR_s \cdot [(1-\alpha) \cdot (P_{req}(j) - P_j^{SCH} - p_{(m,n),s}) + P_j^{SCH} + P_{Noise} \cdot Loss_{(m,n),j} + I_{extra}(m,n,j)]$$

and thus:

$$p_{(m,n),s}^j = \gamma_s \cdot [(1-\alpha) \cdot P_{req}(j) + \alpha \cdot P_j^{SCH} + P_{Noise} \cdot Loss_{(m,n),j} + I_{extra}(m,n,j)]$$

with $$I_{extra}(m \cdot n, j) = \sum_{\substack{k=1 \\ k \neq j}}^{N_{cells}} P_{req}(k) \cdot \frac{Loss_{(m,n),j}}{Loss_{(m,n),k}}$$

and $$\gamma_s = \frac{SNR_s}{1 + SNR_s \cdot (1-\alpha)}.$$

The parameter $p_{(m,n),s}^j$ is set equal to $P_{DCH}^{Min}(s)$ if the calculated power $p_{(m,n),s}^j < P_{DCH}^{Min}(s)$, otherwise the power value resulting from the previous calculation is retained.

Then, for each cell Cj of the area under planning, and for each network service s, the sets $\Omega_j^s(r)$ and $Z_j^s$ are re-calculated, in the following way:

$$\Omega_j^s(r_j^s) = (m, n) \in \Theta_j^s: \quad p_{(m,n),s}^j \leq P_{DCH}^{Max}(s)$$
$$Z_j^s = (m, n) \in \Theta_j^s: \quad p_{(m,n),s}^j \leq P_{DCH}^{Max}(s)$$

in other words, the set $\Omega_j^s(r)$ and the set $Z_j^s$ (that, at the beginning, were initialized so as to contain all the pixels belonging to the set $\Theta_j^s$, including for example all the pixels belonging to the cell service area in uplink for the cell Cj and in respect of the service s) are updated so as to include only those pixels (m,n) of the set $\Theta_j^s$ for which the calculated power $p_{(m,n),s}^j$ does not exceed the maximum power deliverable on the dedicated traffic channel DCH used for the service s by the cell $C_j$.

For each cell $C_j$ of the area under planning, the current value $P_{req}(j)$ of the total power transmitted by the cell is saved as the value of a parameter $p^{(n-1)}_{req}(j)$, and the total transmitted power is re-calculated:

$$P_{req}(j) = P_j^{CCH} + \sum_{s \in S_j^{NGS}} \sum_{(m,n) \in \Omega_j^s(r_j^s)} \overline{X}_s \cdot T_{(m,n),s} \cdot p_{(m,n),s}^j +$$
$$\sum_{s \in S_j^{GS}} \sum_{(m,n) \in Z_j^s} \overline{X}_s \cdot T_{(m,n),s} \cdot p_{(m,n),s}^j.$$

The total transmitted power $P_{req}(j)$ is set equal to:

$$P_{req}(j) = \begin{cases} P_{MAX}(j) * \frac{Thr_{CONG}(p_j)}{100} & \text{if } P_{req}(j) > P_{MAX}(j) * \frac{Thr_{CONG}(p_j)}{100} \\ P_{req}(j) & \text{otherwise} \end{cases}$$

In the first of the two cases listed above, a congestion situation is declared for the cell $C_j$, by setting Flag_KO$_j$=1.

If, among the cells of the area under planning, at least one cell $C_j$ exists for which:

$$|P_{req}(j)_{dB} - P_{req}^{(n-1)}(j)_{dB}| > Toll\_PW$$

where Toll_PW is a predefined, relatively small power control step value (used for decreeing a convergence of the downlink power control algorithm, for example ranging from 0.5 to 1 dB), the operations of calculating the transmission power required to the generic cell (BRS) $C_j$, updating the pixel sets $\Omega_j^s(r)$ and $Z_j^s$ and calculating the total transmitted power are repeated. If instead for all the cells of the area under planning it is $$|P_{req}(j) - P_{req}^{(n-1)}(j)| \leq Toll\_PW$$

no further iterations are performed, and, for each cell $C_j$ and each service s, the cell service area in respect of that service is saved, in the following way:

$$\Omega_j^s = \begin{cases} \Omega_j^s & \text{if Flag\_KO}_j = 0 \\ \Phi_j^s & \text{if Flag\_KO}_j = 1 \end{cases}$$

where $\Phi_j^s$ is a set of pixels taken from an ordered list of pixels ordered in such a way that, denoted as $\mathfrak{R}_{(m,n)}^j$ (Loss$_{(m,n),j}$, $S_j^{NGS}, S_j^{GS}, T_{(m,n),s}$) a sorting function associated with the cell $C_j$ and the pixel (m,n), and depending for example on the traffic present on the pixel for the various GS and NGS services, and link attenuation between the considered pixel and the cell $C_j$, the sorting function take increasing values. In particular, the set $\Phi_j^s$ is built iteratively applying the following formula:

$$P_j^{CCH} + \sum_{s \in S_j^{NGS}} \sum_{(m,n) \in \Omega_j^s(r_j^s)} \overline{X}_s \cdot T_{(m,n),s} \cdot p_{(m,n),s}^j +$$

$$\sum_{s \in S_j^{GS}} \sum_{(m,n) \in Z_j^s} \overline{X}_s \cdot T_{(m,n),s} \cdot p_{(m,n),s}^j$$

adding at each iteration one pixel selected from the ordered list according to the ordering established by the sorting function, until a prescribed maximum value is reached:

$$P_j^{CCH} + \sum_{s \in S_j^{NGS}} \sum_{(m,n) \in \Omega_j^s(r_j^s)} \overline{X}_s \cdot T_{(m,n),s} \cdot p_{(m,n),s}^j +$$

$$\sum_{s \in S_j^{GS}} \sum_{(m,n) \in Z_j^s} \overline{X}_s \cdot T_{(m,n),s} \cdot p_{(m,n),s}^j = P_{MAX}(j) * \frac{Thr_{CONG}(p_j)}{100}$$

Denoted as J the set of all the cells of the area under planning for which a congestion situation is declared (Flag_KO$_j$=1), and denoted as H the sub-set of the set J formed by all the cells belonging to the set J for which $p_j < N_{THR}^{CONG}$ (i.e., for which there remain power fraction thresholds to be tried), if the sub-set H is not void, the congestion level for the generic cell Cj belonging to the sub-set H is modified as follows:

$p_j = p_j + 1$ for each cell $C_j \in H$.

For each cell $C_j$ and for each NGS s, the down-switch level is updated as follows:

$$r_j^s = \begin{cases} r_j^s + 1 & \text{if } r_j^s < Nds_s \\ Nds_s & \text{otherwise;} \end{cases}$$

in other words, if the NGS bit-rate can be further down-switched (i.e., it is not yet at the minimum admissible bit-rate), it is down-switched, otherwise the minimum bit-rate value is retained.

The operations flow then jumps back to the initialization of the sets $\Omega_j^s(r)$ and $Z_j^s$. Alternatively, the NGSs may be classified by degree of importance, or by required power, and the down-switch may be gradually applied starting from the less important NGSs, or by those NGSs that require more power (typically, those having a higher maximum bit-rate).

If on the contrary the sub-set H is void of elements, the algorithm terminates.

At the end, the set $\Omega_j^s(r)$ and the set $Z_j^s$ contain the service areas for the NGSs, as a function of the level of down-switch, and the service areas for the GSs, respectively.

Thanks to the described invention embodiment, it is possible to reproduce, in the network planning process, the actual behavior of the network, taking into account the soft-congestion control policies (RRM algorithms) used in the normal operation of the network for managing situations of congestion, exploiting strategies such as those outlined in the document TR 25922 6.0.1 (2004-04) entitled "3$^{rd}$ Generation Partnership Project, Technical Specification Group Radio Access Network, Radio resource management strategies (Release 6)".

Taking into account, in the planning of the network, the peculiarities of the different services offerable by the network, particularly as far as the bit-rate scalability is concerned, allows dimensioning the global services areas in a way more close to the real way of working of the network, with results that are less conservative in terms, for example, of global service area and served traffic.

Figure 5:
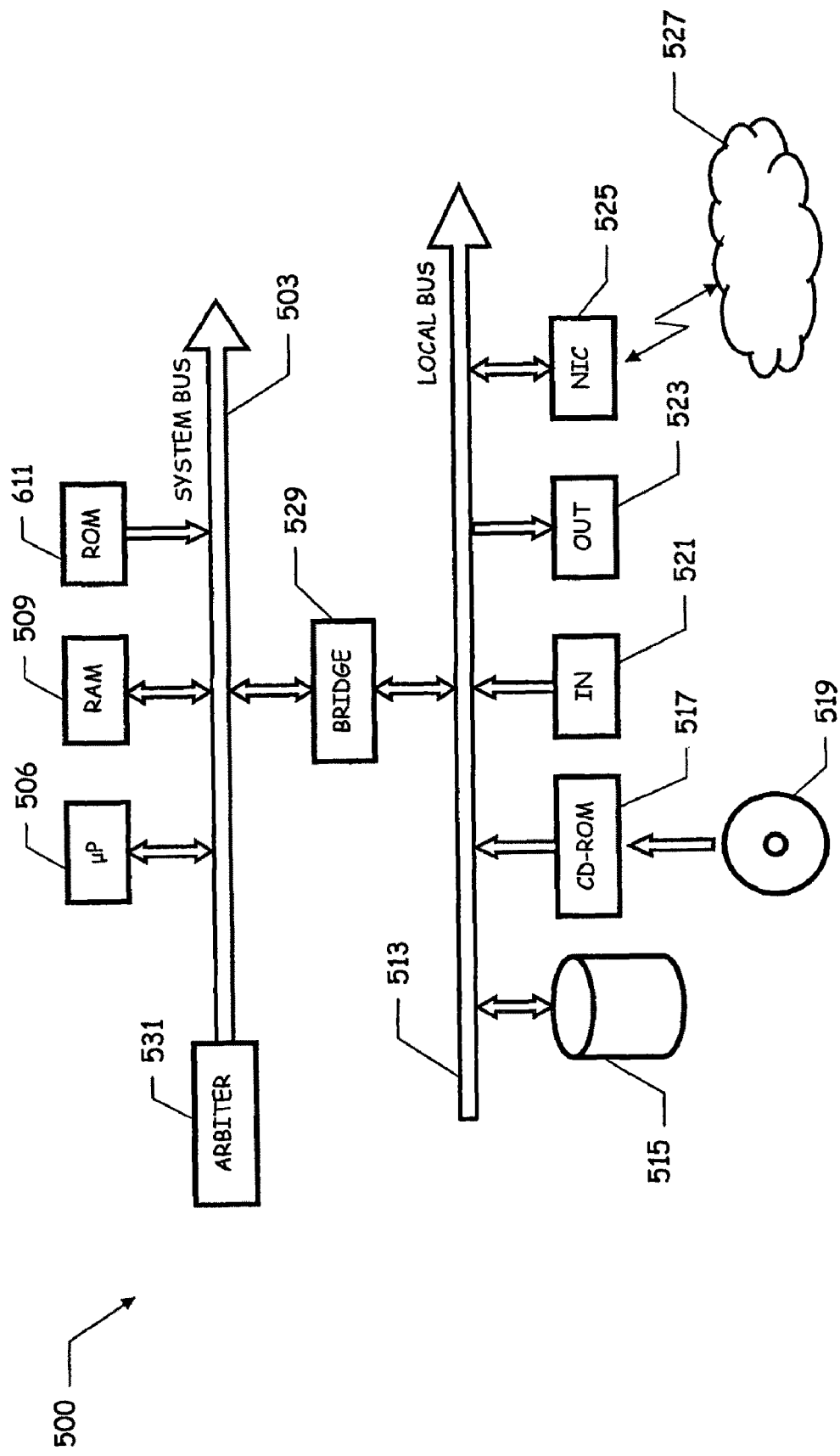
FIG. 5 schematically shows the main functional components of a data processing apparatus that, suitably programmed, is adapted to carry out the method according to an embodiment of the invention.

The above described method may be implemented in hardware, software, or partly in hardware and partly in software. In particular be carried out by a suitably programmed data processing apparatus or system like a personal computer or a workstation; the structure of a general-purpose computer 500 is schematically depicted in FIG. 5.

The computer 500 is comprised of several units that are connected in parallel to a system bus 503. In detail, one (possibly more) processor (µp) 506 controls the operation of the computer 500; a RAM 509 is directly used as a working memory by the microprocessor 506, and a ROM 511 stores the basic code for a bootstrap of the computer 500. Peripheral units are connected (by means of respective interfaces) to a local bus 513. Particularly, mass storage devices comprise a hard disk 515 and a CD-ROM/DVD-ROM drive 517 for reading CD-ROMs/DVD-ROMs 519. Moreover, the computer 500 typically includes input devices 521, for example a keyboard and a mouse, and output devices 523, such as a display device (monitor) and a printer. A Network Interface Card (NIC) 525 is used to connect the computer 500 to a network 527, e.g. a LAN. A bridge unit 529 interfaces the system bus 503 with the local bus 513. Each microprocessor 506 and the bridge unit 529 can operate as master agents requesting an access to the system bus 503 for transmitting information; an arbiter 531 manages the granting of the access to the system bus 503.

Figure 6:
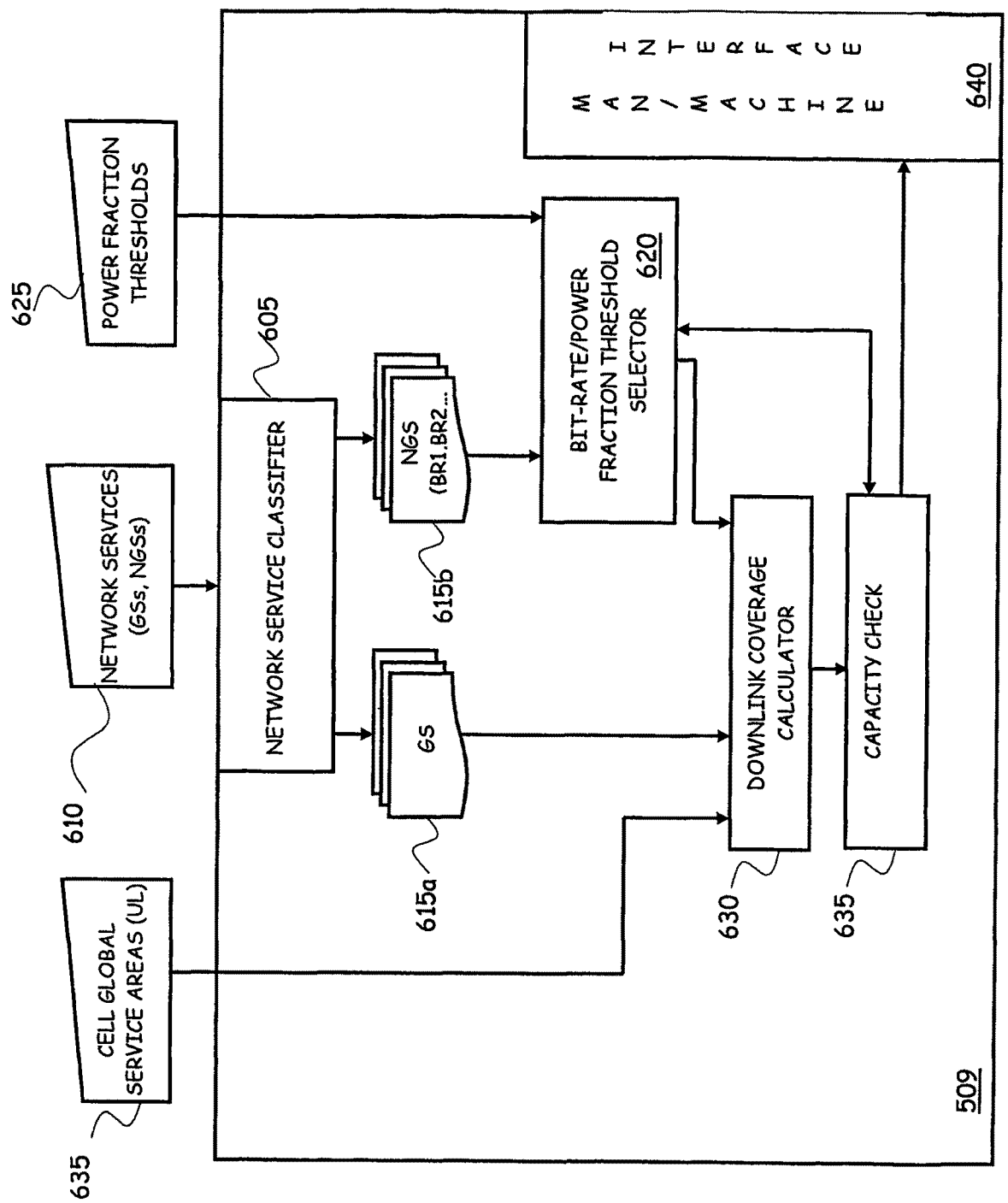
FIG. 6 schematically shows the main components of a program, when executed on the data processing apparatus of FIG. 5, implementing the method according to an embodiment of the present invention.

FIG. 6 is a pictorial representation of the main computer program components adapted to implement the above-described method are pictorially shown, according to an embodiment of the invention. In particular, FIG. 6 schematically depicts a partial content of the working memory 509 of the computer of FIG. 5. The information (programs and data) is typically stored on the hard disks and loaded (at least partially) into the working memory when the program is executed. The programs may be initially installed onto the hard disks from, e.g., CD-ROMs or DVD-ROMs, or they may be downloaded from, e.g., a distribution server machine through the data communications network 527.

A network service classifier module 605 receives in input a list 610 of network services that the network being planned is intended to offer to the users; the network services are properly described, particularly in order to allow the network service classifier module 605 distinguish among GSs and NGSs; the description of the GSs includes the fixed bit-rates to be guaranteed for those services, whereas the description of the NGSs includes a list of the different admissible bit-rates at which the services can be offered. The network service classifier module 605 classifies the network services of the list 610 into a list of GSs 615a, and a list of NGSs 615b.

A bit-rate/power fraction threshold selector module 620 allows selecting one among the possible admissible bit-rates for the NGSs, and one in a list of admissible power fraction thresholds 625 (e.g., 50%, 60%, 100% of the maximum power deliverable by the cells).

A downlink coverage calculator module 630 receives uplink cell global service areas 635, calculated for example in the previous phase of uplink power control of the planning process, the GSs, and, from the bit-rate/power fraction threshold selector module 620 the NGSs, with the selected respective bit-rates, and the power fraction threshold(s). The downlink coverage calculator module 630 calculates the downlink coverage, particularly it determines the power required to each cell for providing the specified network services.

A capacity check module 635 performs the capacity check, verifying whether, for the generic cell, the calculated required power exceeds a cell's maximum deliverable power. The outcome of the check performed by the capacity check module 635 is used to drive the bit-rate/power fraction threshold selector module 620, so as to modify the bit-rate of one or more NGSs, and the power fraction threshold(s), for those cells that do not pass the capacity check.

A man/machine interface module 640, e.g. a graphical user interface, allows displaying the results of the downlink power control algorithm.

Although the present invention has been disclosed and described by way of some embodiments, it is apparent to those skilled in the art that several modifications to the described embodiments, as well as other embodiments of the present invention are possible without departing from the spirit or essential features thereof/the scope thereof as defined in the appended claims.

For example, different values and number of power fraction threshold could be set in respect of the different network cells.

The invention claimed is:

1. A method for planning a cellular mobile telecommunications network comprising at least one network cell and intended to provide network services to users located in said network cell, wherein the network services comprise at least one network service deliverable at a plurality of provisioning rates, comprising:
generating an overall cell global service area for the cell, comprising combining a plurality of sub-areas, wherein each sub-area represents an area where the network service is deliverable at a particular provisioning rate, and wherein the sub-areas are generated by:
a) setting a current provisioning rate to the highest of said provisioning rates;
b) estimating a power required to the at least one network cell for providing the at least one network service in the service area of the cell at the current provisioning rate;
c) comparing the estimated required power to a maximum power deliverable by the at least one cell; and
if the estimated required power does not exceed the maximum deliverable power, providing the service area of the cell as the sub-area for the chosen provisioning rate; or
if the estimated required power exceeds the maximum deliverable power,
d) providing a reduced service area of the cell as the sub-area for the chosen provisioning rate, wherein the estimated power required to the at least one network cell for providing the at least one network service at the current provisioning rate in the reduced service area does not exceed the maximum deliverable power;
e) updating the current provisioning rate to the immediately lower provisioning rate of said plurality, if any; and
f) repeating steps b) and c) and, if required, steps d) and e).

2. The method of claim 1, wherein the service area of the cell corresponds to a service area determined at the end of an uplink coverage evaluation of the planning method.

3. The method of claim 1, wherein the service area of the cell comprises a plurality of elementary area elements, and wherein estimating a power required to the at least one network cell comprises:
estimating, for each elementary area element, a respective required transmission power; and
discarding from the service area the elementary area elements having a respective required transmission power above a predetermined transmission power threshold.

4. The method of claim 1, wherein providing a reduced service area of the cell comprises:
g) ordering the elementary area elements in a list based on the value of at least one parameter selected from the group of:
link loss;
total traffic offered by pixels;
type of traffic offered by the pixels;
h) obtaining the reduced service area by including elementary area elements taken from an ordered list starting from one end thereof;
i) calculating a total required power corresponding to the elementary area elements in the reduced service area; and
l) repeating steps h) and i) until the total required power exceeds the maximum deliverable power.

5. The method of claim 1, further comprising varying the maximum deliverable power as a consequence of said updating the current provisioning rate.

6. The method of claim 5, wherein said varying the maximum deliverable power comprises:
defining a first and at least one second maximum deliverable power thresholds, the first threshold being lower than the second threshold;
initializing the maximum deliverable power to a value corresponding to the first power threshold; and
as a consequence of said updating the current provisioning rate, setting the maximum deliverable power to the second power threshold.

7. The method of claim 1, further comprising setting an initial required power of the at least one cell to a power corresponding to common communications channels of the cell.

8. The method according to claim 7, wherein said estimating the power required to the at least one network cell for providing the at least one network service in the service area comprises adding to the power corresponding to common communications channels of the cell a power required for providing the at least one network service in the service area.

9. The method according to claim 8, wherein said at least one network service comprises at least one guaranteed network service having a single admissible provisioning rate, said estimating the power required to the at least one network cell for providing the at least one network service comprises adding to the power corresponding to common communications channels of the cell a power required for providing the at least one guaranteed network service in the service area, and a power required for providing the at least one network service at the selected provisioning rate.

10. A data processing system comprising means adapted to carry out the steps of the method according to claim 1.

11. A non-transitory computer-readable storage medium containing instructions that when executed by a computer, perform the method according to claim 1.

12. A cellular mobile telecommunications network comprising at least one network cell and intended to provide network services to users located in said network cell, wherein the network services comprise at least one network service deliverable at a plurality of admissible provisioning rates, said cellular mobile telecommunication network being planned by applying the method according to claim 1.

* * * * *